(12) United States Patent
Gupta et al.

(10) Patent No.: US 8,738,355 B2
(45) Date of Patent: May 27, 2014

(54) METHODS AND APPARATUSES FOR PROVIDING PREDICTIVE TRANSLATION INFORMATION SERVICES TO MOBILE STATIONS

(75) Inventors: Rajarshi Gupta, Sunnyvale, CA (US); Ayman Fawzy Naguib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 702 days.

(21) Appl. No.: 12/986,003

(22) Filed: Jan. 6, 2011

(65) Prior Publication Data

US 2012/0179448 A1    Jul. 12, 2012

(51) Int. Cl.
*G06F 17/28* (2006.01)

(52) U.S. Cl.
USPC ............... 704/2; 704/3; 704/5; 704/7; 704/8; 704/9

(58) Field of Classification Search
CPC ............ G06F 17/2818; G06F 17/2836; G06F 17/2827; G06F 17/2872; G06F 17/289
See application file for complete search history.

(56) References Cited

U.S. PATENT DOCUMENTS

| | | | |
|---|---|---|---|
| 7,076,255 B2 | 7/2006 | Parupudi et al. | |
| 7,272,377 B2 * | 9/2007 | Cox et al. | 455/403 |
| 7,460,884 B2 * | 12/2008 | Sinclair et al. | 455/556.1 |
| 7,565,157 B1 | 7/2009 | Ortega et al. | |
| 7,689,245 B2 * | 3/2010 | Cox et al. | 455/550.1 |
| 7,711,571 B2 | 5/2010 | Heiner et al. | |
| 8,041,555 B2 * | 10/2011 | Buccella | 704/2 |
| 8,144,990 B2 * | 3/2012 | Englund et al. | 382/181 |
| 2007/0006098 A1 | 1/2007 | Krumm et al. | |
| 2008/0221862 A1 * | 9/2008 | Guo et al. | 704/2 |
| 2009/0048820 A1 | 2/2009 | Buccella | |
| 2009/0048821 A1 * | 2/2009 | Yam et al. | 704/3 |

FOREIGN PATENT DOCUMENTS

EP    1335620 A1    8/2003

OTHER PUBLICATIONS

Ashwin Shenoy U, "Location Based Translators," Siemens AG, Juergen Carstens, Oct. 25, 2006, Bangalore, India, pp. 1-2.
International Search Report and Written Opinion—PCT/US2012/020355, ISA/EPO—May 11, 2012.

* cited by examiner

*Primary Examiner* — Leonard Saint Cyr
(74) *Attorney, Agent, or Firm* — Arnold J. Gum

(57) ABSTRACT

Techniques are provided which may be implemented using various methods and/or apparatuses to allow a mobile station to request and receive translation information associated with a location (e.g., a region, a point of interest, etc.). The translation information may be based, at least in part, on historical information associated with at least one other request associated with the location and previously obtained from at least one other mobile station.

77 Claims, 6 Drawing Sheets

METHODS AND APPARATUSES FOR PROVIDING PREDICTIVE TRANSLATION INFORMATION SERVICES TO MOBILE STATIONS

BACKGROUND

1. Field

The subject matter disclosed herein relates to electronic devices, and more particularly to methods and apparatuses for use in providing written and/or spoken language translation information services to mobile stations.

2. Information

Computerized techniques for translation of written and/or spoken languages continue to improve over time. Wireless communication networks also continue to improve not only in their coverage, but also in bandwidth and services which may be provided to mobile stations such as, for example, mobile telephones, smart phones, and various other portable electronic devices.

It is particularly useful for a user of a mobile station to use a mobile station and available services to translate information from one written and/or spoken language to another. For example, while traveling a user may benefit by having menu items in a restaurant translated to a language they understand. Conversely, a user may benefit by having a question (e.g., that they want to ask the waiter) translated into a language that the waiter understands.

At times, translating between languages can be particularly difficult, even for trained experts. Hence, computerized techniques for written and/or spoken language translation are not infallible. More advanced computerized techniques for written and/or spoken language translation tend to require more processing power, processing time, and/or memory/information. Accordingly, such language translation capabilities may not be well suited for stand-alone use in a mobile station having limited processing power, memory, and/or battery power. However, such language translation capabilities may be provided by one or more other computing devices to which a mobile station may connect via one or more networks.

To provide improved written and/or spoken language translation services to a mobile station, it may be useful to know where the mobile station is located. For example, if a user is traveling in China, a translation service may translate from German to Mandarin if the mobile station is determined to be located in Beijing or from German to Cantonese if the mobile station is determined to be located in Shanghai. Further written and/or spoken language translation service improvement may be realized by considering local context information relating to, for example, the user's current activity. Unfortunately, local context information may not always be available.

SUMMARY

In accordance with certain aspects, techniques are provided which may be implemented using various methods and/or apparatuses to provide translation information services to mobile stations.

For example, techniques are provided which may be implemented using various methods and/or apparatuses to allow a mobile station to request and receive translation information associated with a location (e.g., a region, a point of interest, etc.). The translation information may be based, at least in part, on historical information associated with at least one other request associated with the location and previously obtained from at least one other mobile station.

In accordance with an example implementation, a method may be implemented via one or more computing devices to obtain one or more signals representing a request for translation information from a mobile station. Here, for example, translation information may be associated with one or more written and/or spoken languages. The method may further include, for example, associating a location with the request for translation information, and generating requested translation information based, at least in part, on the request for translation information and historical information associated with at least one other request for translation information. Here, for example, the other request for translation information may be associated with the location and previously obtained from at least one other mobile station.

In certain example implementations, a method may further comprise transmitting a response comprising the requested translation information to the mobile station. In certain example instances, a response may comprise text information, audio information, image information, and/or the like, or a combination thereof. In certain example instances, a response may include additional information that may be based, at least in part, on historical information, metadata information, etc. For example, in certain implementations, some additional information may include one or more predicted responses.

In certain example implementations, a method may further comprise translating first information of a request that is represented in a first language into corresponding second information represented in a second language, wherein the requested translation information comprises the second information. In certain example implementations, such second information may comprise a plurality of different translated versions of the first information.

In certain example implementations, a method may further comprise identifying first information to be translated based, at least in part, on the request for translation information. Here, for example, the request for translation information may include text information, audio information, image information, and/or the like, or a combination thereof.

In certain example implementations, a method may further comprise identifying metadata information associated with the mobile station based, at least in part, on the request for translation information. By way of example, such metadata information may include or otherwise relate to requested translation service information, location information, context information, time information, user information, mobile station information, and/or the like, or a combination thereof. In certain example implementations, a method may further comprise identifying the location based, at least in part, on the metadata information.

In certain example implementations, historical information may include or otherwise relate to statistical information that may be based, at least in part, on a plurality of other requests for translation information associated with the location and previously obtained from a plurality of other mobile stations.

In certain example implementations, a location may be associated with a region, a structure, a point of interest, an estimated position of the mobile station, an estimated orientation of the mobile station, and/or the like, or a combination thereof.

In certain example implementations, a method may further comprise updating historical information based, at least in part, on a request for translation information from the mobile station.

In accordance with yet another example implementation, a method may be implemented via a mobile station. The method may, for example, comprise transmitting a request for translation information, wherein the translation information may be associated with a location and one or more written and/or spoken languages. Here, the request for translation information may be intended to be delivered directly or indirectly to a translation information service. The example method further includes receiving a response comprising requested translation information. Here, for example, the requested translation information may be based, at least in part, on the request for translation information, and historical information associated with at least one other request for translation information associated with the location and previously transmitted to the translation information service by at least one other mobile station. The example method further comprises generating a presentation for a user based, at least in part, on the response. In certain example implementations, such a method may further comprise selecting at least one of a plurality of different translated versions of the information for a presentation.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

In accordance with certain aspects, techniques are provided which may be implemented using various methods and/or apparatuses to provide translation information services to mobile stations.

In accordance with certain aspects, methods and apparatuses may be implemented to provide a translation information service that may establish and/or utilize historical information regarding certain "locations" which may be associated with a request for translation information received from a mobile station. The historical information may, for example, be associated with a plurality of previously handled requests for translation information associated with such locations. Such historical information may, for example, be of use in providing a more accurate and/or otherwise more useful translation to a user. For example, a location may relate to a particular point of interest for which certain terms or phrases, or perhaps dialects, etc., may be of particular use to a user, and hence the historical information may indicate such. Several other example benefits and/or or uses are illustrated in the description below.

Figure 1:
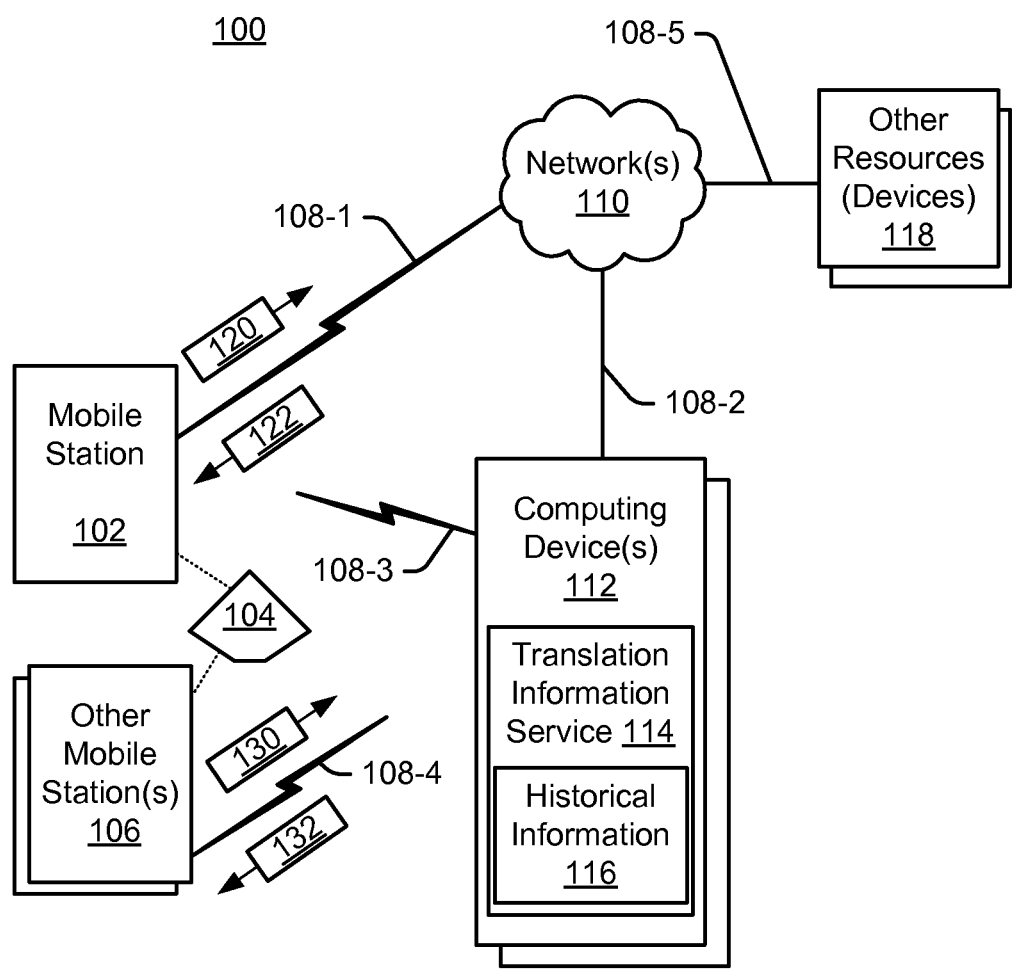
FIG. 1 is a schematic block diagram illustrating an exemplary environment that includes one or more computing devices capable of providing translation information services to mobile stations, in accordance with an implementation.

Attention is drawn now to FIG. 1 which is a schematic block diagram illustrating an exemplary environment 100 that includes one or more computing devices 112 capable of providing translation information services to a mobile station 102, in accordance with an implementation.

Mobile station 102 is representative of any electronic device that may be reasonably moved about by a user. By way of example but not limitation, mobile station 102 may comprise a computing and/or communication device such as a mobile telephone, a smartphone, a lap top computer, a tablet computer, a wearable computer, a personal digital assistant, a navigation device, etc.

Mobile station 102 may, for example, be enabled (e.g., via one or more network interfaces) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMax, Ultra Mobile Broadband (UMB), and/or the like.

FIG. 1 also illustrates a location 104, one or more other mobile stations 106, various communication links 108, one or more networks 110, a translation information service 114, historical information 116, and one or more other computing resources 118.

As illustrated and described in greater detail herein, mobile station 102 may transmit a request for translation information 120 via at least one communication link 108 to at least one computing device 112. Here, the request for translation information 120 may be associated with location 104. Subsequently, mobile station 102 may receive a response 122 to its request for translation information 120 via at least one communication link 108 from at least one computing device 112. In this example, mobile station 102 may transmit and receive one or more signals representing such requests and responses over a wireless communication link 108-1 via network(s) 110. In other example implementations, mobile station 102 may transmit and/or receive one or more signals representing such requests and/or responses over a wireless communication link 108-3 from a computing device 112.

It should be recognized that one or more communication links 108 shown in FIG. 1, may comprise one or more wireless communication links and/or one or more non-wireless communication links (e.g., with signals transmitted using one or more wires, fibers, etc.), and that such communication links 108 and/or network(s) 110 may also represent various supporting devices and/or technologies associated therewith.

As further illustrated and described in greater detail herein, prior to mobile station 102 transmitting request for translation information 120, one or more other mobile stations 106 may transmit their own requests for translation information 130, e.g. via communication link(s) 108-4, to at least one computing device 112. Here, for example, requests for translation information 130 may be associated with location 104. As shown, these other mobile stations 106 may also have previously received applicable responses 132 from computing device 112.

As described herein, historical information 116 may be associated with such other requests for translation information 130. Indeed, historical information 116 may comprise information (e.g., statistical information, other informative information, etc.) associated with a plurality of requests and/or responses, and possibly additional information, associated with one or more locations.

By way of example but not limitation, location 104 may be representative of a region (e.g., one or more countries, one or more geographic regions, a city, a village, etc., or portion thereof), a structure (e.g., one or more buildings, etc., or portion thereof), one or more other point(s) of interest (e.g., a business, a store, an entity or one or more people, an object, an activity, etc., or portion thereof), and/or other like information that may be considered in providing translation information service 114. In certain example implementations, location 104 may be representative of an estimated position and/or orientation of a mobile station, which may be associated with request for translation information 120. Location 104 may, for example, be considered by translation information service 114 in translating applicable language-related information identified in request for translation information 120 from a first written and/or spoken language to a second written and/or spoken language. For example, location 104 may represent a particular region in which certain dialects and/or other cultural aspects, etc., may be considered in providing written/spoken language translation. For example, location 104 may represent a particular point of interest in which certain specific terms or phrases, etc., may be considered in providing written/spoken language translation. Indeed, in certain instances, a plurality of (selectable) written/spoken language translation versions may be identified by translation information service 114 with regard to a location.

It should be recognized that in certain example implementations one or more locations need not be mutually exclusive in their representations. Thus, two or more locations may overlap in whole or part, and/or otherwise relate to like or similar information that may be considered in providing translation information service 114. In certain examples, one location may comprise one or more other locations. For example, a city (e.g., a possible location) may comprise one or more culturally distinguishable neighborhoods (e.g., possible locations), etc., for which different language information may be considered in providing translation information service 114. In another example, a store (e.g., a possible location) may comprise one or more areas (e.g., possible locations) with distinguishable objects (e.g., possible locations) or activities (e.g., possible locations), etc., for which different language information may be considered in providing translation information service 114.

As described in the example implementations herein, historical information 116 associated with such "locations" may be established (e.g., built, maintained, updated, or otherwise modified) over time, for example, based, on requests for translation information 130 and/or corresponding responses 132, and/or other information (e.g., from user feedback, other resources 118, etc.).

In certain example implementations, historical information 116 may be provided as part of, and/or otherwise processed using, a statistical database or other like tools/service. Thus, for example, historical information 116 may comprise statistical information relating to previous requests/responses for written/spoken language translation services associated with a location which may be useful to translation information service 114 in translating written/spoken language information identified in a current request for translation information 120. Such statistical information may, for example, identify a probability associated with one or more languages, dialects, cultural aspects, unique terminology, specific points of interest, etc., that may be considered during translation. By way of example, statistical information may identify that a particular location has a higher or lower probability of usage of certain written/spoken language terms, phrases, etc., as compared to other locations. In certain examples, statistical information may identify that, for a particular location, certain (possibly different or unique) dialects, spellings, pronunciations, etc., are at least more or less statistically likely to be of use in the particular location as compared to other locations (e.g., neighboring locations). In certain examples, statistical information may identify that, for a particular location, there is some measure of probability regarding the presence or absence of an item of interest, an event, an activity, etc., which may affect the translation of written/spoken language at certain times or dates, and/or upon occurrence of other conditions. For example, local holiday or festival practices may affect the translation of written/spoken language associated with a particular location. Accordingly, in certain example implementations, historical information 116 may comprise statistical information and/or other useful information which may be considered in establishing a translation dictionary and/or other like written/spoken language information associated with a location. In certain instances, for example, different types of stores or other like settings may use different vocabularies, and/or have special terminology associated therewith.

In certain example implementations, historical information 116 may comprise statistical information relating to a probability that one or more predicted requests for translation information may be subsequently received from mobile station 102. For example, for a given location or set of locations, certain patterns may be statistically identified for similar sequences of requests/responses for translation services. For example, certain users (via their mobile stations) may send a similar sequence of requests for translation information over a period of time as they move about a location and/or from one location to another location.

By way of example, a user may enter a museum having signage in a foreign language and employ a mobile station to initially transmit a request for translation information regarding an entry sign (e.g., specifying hours of operation, entry fees, rules, etc.). Subsequently, the user may enter a particular wing of the museum wherein a sign or possibly a brochure describes an exhibited work of art. Here, the user may again employ the mobile station to transmit another request for translation information regarding all or part of the description in the sign or brochure. Such actions may continue as the user visits other areas of the museum.

Accordingly, if a plurality of users of mobile stations follow similar paths and/or request similar or like information, then historical information 116 may comprise statistical information which may, at times, allow translation information service 114 to further predict one or more possible requests that might be expected in the future from the mobile station (but which have not yet been transmitted), and provide, e.g., as part of a response to a request (that has been transmitted), additional information that may be of interest or use to the user of the mobile station. By providing additional information (e.g., all or part of one or more predicted responses) in response 122, for example, time and/or resource usage may be reduced, which may lead to an improvement in a user's experience with translation information service 114 and/or improved efficiency of translation information service 114.

As illustrated by the non-limiting example herein, historical information 116 may comprise and/or otherwise be based, at least in part, on a plurality of other requests for translation information and/or responses associated with location 104. In certain example implementations, historical information 116 may comprise and/or otherwise be based, at least in part, on other information associated with one or more locations, certain written/spoken languages/dialects/etc., certain metadata information, and/or the like.

In a particular example, all or part of historical information 116 may be processed using statistical analysis, data-mining, and/or other like data analysis techniques, applications, tools, etc. It should be recognized that such data analysis techniques may, for example, be performed using one or more computing devices programmed to operate with and/or without a human analyst's input. One example result of such data analysis may be represented by historical information comprising statistical information that may be associated with certain terms, phrases, etc., for use in written/spoken language translation relating to a location (and possibly one or more other conditions, metadata, etc.). One example result of such data analysis may be represented by historical information comprising predicted information for possible use as additional information in a response for written/spoken language translation information relating to a location (and possibly one or more other conditions, metadata, etc.). One example result of such data analysis may be represented by historical information comprising translation information (e.g., a dictionary, etc.) that may be tailored and/or otherwise affected in some manner for use in translating to and/or from a written/spoken language with regard to a location (and possibly one or more other conditions, metadata, etc.).

Figure 2:
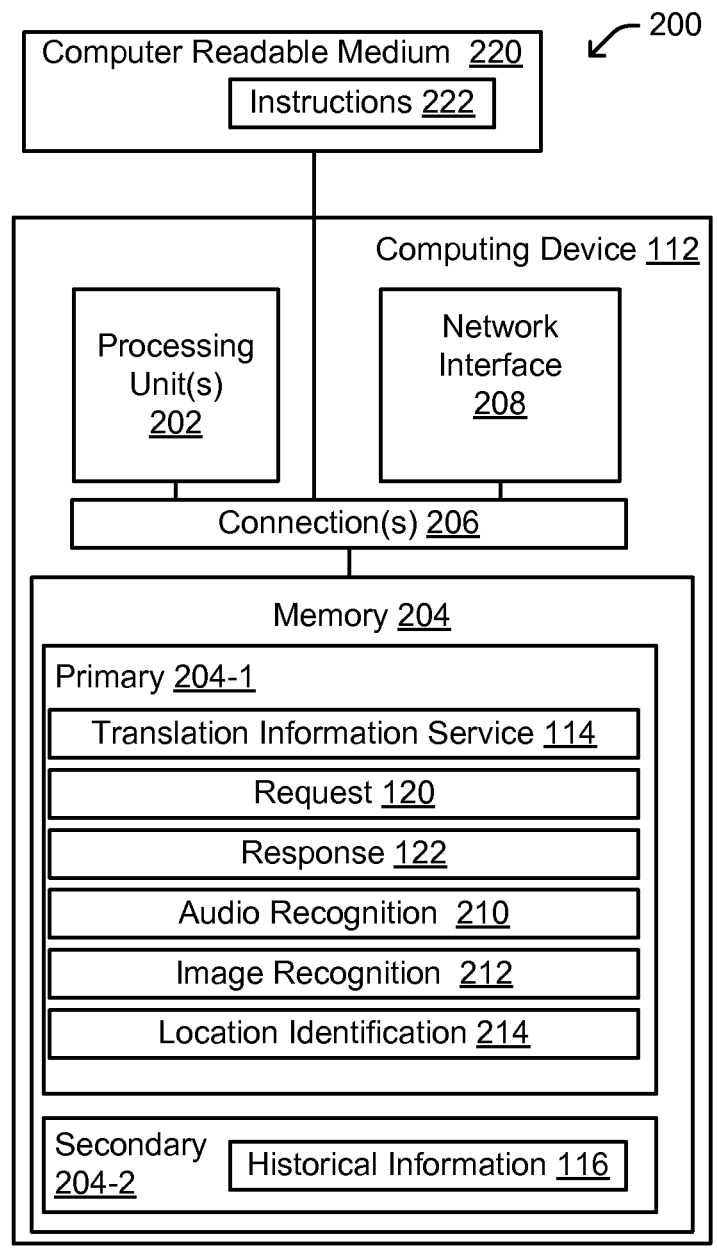
FIG. 2 is a schematic block diagram illustrating certain features of a computing device, for example as in FIG. 1, capable of providing a translation information service to a mobile station, in accordance with an implementation.

Reference is made next to FIG. 2, which is a schematic block diagram illustrating certain features of computing device 112, for example as in FIG. 1, capable of providing a written/spoken language translation information service to a mobile station, in accordance with an implementation FIG. 2 shows a specific apparatus 200 in the form of a computing device 112, one or more of which may provide a translation information service 114 to one or more mobile stations. In certain example implementations, apparatus 200 may act as an individual server, part of a server farm, part of a cloud computing arrangement, etc. In certain example implementations, apparatus 200 may act as part of a network 110, e.g., at a base station, an access point, etc. In certain example implementations, apparatus 200 may comprise and/or be coupled to one or more data storage devices that may be arranged store all or part of historical information 116.

With this in mind, as illustrated in FIG. 2, example computing device 112 may comprise one or more processing units 202, memory 204, connections 206, and a network interface 208. As shown, memory 204 may comprise a primary memory 204-1, and/or a secondary memory 204-2. Here, for example, primary memory 204-1 is illustrated as storing instructions and/or data relating to translation information service 114, which may be executed or used by processing unit(s) 202. Secondary memory 204-2 is illustrated as storing at least a portion of historical information 114, for example, which also may be accessed and used by processing unit(s) 202.

As illustrated, at certain times primary memory 204-1 may, for example, store information relating to one or more requests for translation information and/or one or more responses. For example, a request for translation information 120 may be received from mobile station 102 via network interface 208. For example, a response 122 may be generated by processing unit(s) 202 and transmitted to mobile station 102 via network interface 208. Network interface 208 may, for example, comprise one or more wireless transmitters/receivers and/or one or more non-wireless interfaces (e.g., Ethernet, etc.).

In certain example implementations, computing device 112 may be arranged to process information in request for translation information 120 to identify first information that may be translated into second data. For example, computing device 112 may be arranged to perform audio recognition (e.g., speech recognition) based on information in request for translation information 120. In one example implementation, processing unit(s) 202 may execute instructions in an audio recognition module 210 to convert recorded audio information (e.g., a person's voice as recorded by mobile station 102) to text or other useful formatted data that may be processed by translation information service 114. In other example implementations, separate devices and/or circuitry (not shown) may be employed to perform audio recognition.

In another example, computing device 112 may be arranged to perform image recognition (e.g., to identify information captured by a camera or scanner) based on information in request for translation information 120. In one example implementation, processing unit(s) 202 may execute instructions in an image recognition module 212 to convert captured still images, video images, scanned images, other data files (e.g., PDFs, etc.), and/or the like, to identify text or other useful formatted data that may be processed by translation information service 114. In other example implementations, separate devices and/or circuitry (not shown) may be employed to perform image recognition.

In yet another example, computing device 112 may be arranged to perform location identification (e.g., to estimate or otherwise identify location 104) based on information in request for translation information 120. In one example implementation, processing unit(s) 202 may execute instructions in a location identification module 214 to estimate or otherwise identify location 104 for use by translation information service 114. For example, should a mobile station be unable to provide an estimated location in request for translation information 120, computing device 112 may provide and/or seek assistance of one or more other devices to identify a location 104 using various known mobile station location techniques. In certain example implementations, separate devices and/or circuitry (not shown) may be employed to perform or otherwise support such location identification. In other examples, however, a mobile station may be able to provide an estimated location in a request for translation information 120 (e.g., in metadata) that may be accessed by computing device 112 to identify location 104.

As illustrated, computing device 112 may take the form of a specific computing device comprising one or more processing units 202 to perform data processing (e.g., in accordance with all or part of the techniques provided herein) coupled to memory 204 via one or more connections 206. Processing unit(s) 202 may be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within computing device 112. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 220. As illustrated, memory 204 and/or computer readable medium 220 may comprise computer executable instructions 222 associated with data processing (e.g., in accordance with the techniques provided herein).

Figure 3:
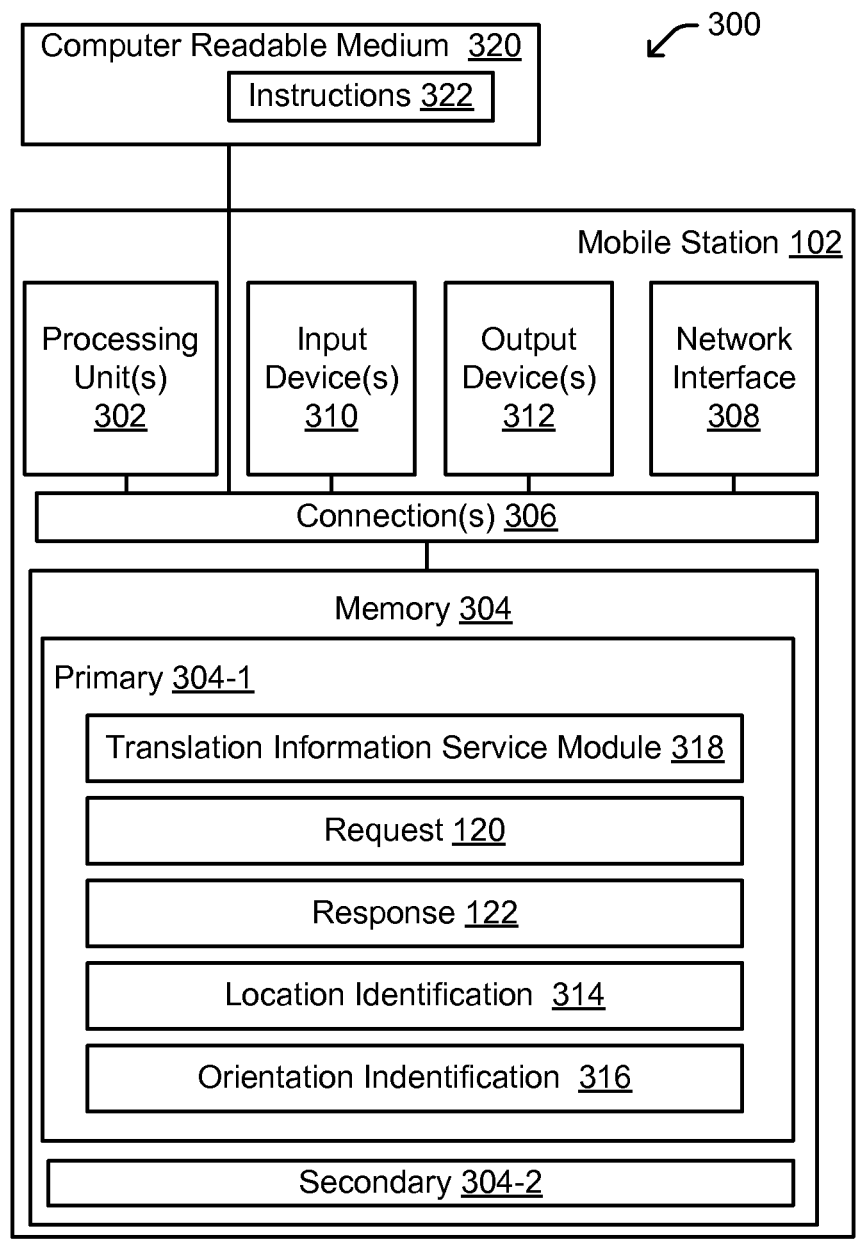
FIG. 3 is a schematic block diagram illustrating certain features of a mobile station, for example as in FIG. 1, for which a translation information service may be provided, in accordance with an implementation.

Reference is made next to FIG. 3, which is a schematic block diagram illustrating certain features of mobile station 102, for example as in FIG. 1, for which a written/spoken language translation information service may be provided, in accordance with an implementation.

FIG. 3 shows a specific apparatus 300 in the form of a mobile station 102 that may operatively interface with a translation information service 114. In certain example implementations, apparatus 300 may take the form of any electronic device that may be reasonably moved about by a user.

With this mind, as illustrated in FIG. 3, example mobile station 102 may comprise one or more processing units 302, memory 304, connections 306, a network interface 308, one or more user input devices 310, and one or more user output devices 312. As shown, memory 304 may comprise a primary memory 304-1, and/or a secondary memory 304-2. Here, for example, primary memory 304-1 is illustrated as storing instructions and/or data relating to a translation information service module 318, which may be executed or used by processing unit(s) 302. For example, translation information service module 318 may be executed by processing unit(s) 302 to generate a request for translation information 120 and initiate transmission of such to one or more computing devices 112 via network interface 308. For example, translation information service module 318 may be executed by processing unit(s) 302 to handle a subsequent response 122 received from one or more computing devices 112 via network interface 308.

As illustrated, mobile station 102 may take the form of a specific computing device comprising one or more processing units 302 to perform data processing (e.g., in accordance with all or part of the techniques provided herein) coupled to memory 304 via one or more connections 306. Processing unit(s) 302 may be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within mobile station 102. Secondary memory 304-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 320. As illustrated, memory 304 and/or computer readable medium 320 may comprise computer executable instructions 322 associated with data processing (e.g., in accordance with the techniques provided herein).

Figure 4:
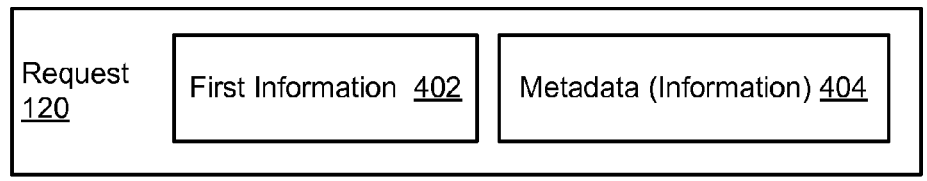
FIG. 4 is an illustrative depiction of a request for translation information as may be transmitted by a mobile station, for example as in FIG. 1, in accordance with an implementation.

As illustrated by representative information 400 in FIG. 4, in certain example implementations, request for translation information 120 may comprise first information 402 and optional metadata 404. Example information 400 may take the form of data that is represented by one or more signals and may be stored in memory 204 and/or memory 304.

All or portions of example information 400 may comprise text information, audio information, and/or image information in one or more formats that may be processed by translation information service 114. Thus, for example, first information 402 may comprise text information inputted via at least one user input device 310 (e.g., keyboard, touch screen, etc.), and/or otherwise available in memory 304 (e.g., a downloaded data file, a file generated using audio recognition and/or image recognition, etc.). Here, for example, text information may comprise or otherwise represent characters, phrases, concepts, icons, etc., associated with a first written language that is to be translated into a second written/spoken language by translation information service 114. As such, in one example, a user may input text in a first language (e.g., a question or statement that the user would like to communicate to a person). A response 122 may then comprise corresponding text information in the second language, which may then be presented through an output device 312 (e.g., a display, a projector) and hopefully understood by the other person.

Conversely, in another example, a person other than the user may input text in a first language (e.g., an answer or statement that the person would like to communicate to the user). A response 122 may then comprise corresponding text information in the second language, which may then be presented through an output device 312 (e.g., a display, a projector) and hopefully understood by the user. In other examples, such responses may comprise corresponding audio and/or image information in the second written/spoken language, which may then be presented through an output device 312 (e.g., a speaker or a display) and hopefully understood by either the user or other person accordingly.

In another example, all or portions of first information 402 may comprise audio information (e.g., in a spoken language) captured via at least one user input device 310 (e.g., a microphone) and/or otherwise available in memory 304 (e.g., a downloaded data file, etc.) that may be processed by translation information service 114. Thus, in one example, a user may speak into a microphone to record a phrase, etc., in a first language that may then be translated into a second written/spoken language by translation information service 114. Here, for example, a response 122 may comprise corresponding audio information in the second language, which may then be played through an output device 312 (e.g., a speaker) and hopefully understood by a person other than the user (e.g., a doctor, a ticket agent). Conversely, in another example, a person other than the user (e.g., a shop owner, a taxi cab driver) may speak into a microphone to record a phrase, etc., in a first language that may then be translated into a second language by translation information service 114. Here, for example, a response 122 may comprise corresponding audio information in the second language, which may then be played through an output device 312 (e.g., a speaker) and hopefully understood by the user. In other examples, such responses may comprise corresponding text and/or image information in the second language, which may then be presented through an output device 312 (e.g., a display, a projector) and hopefully understood by either the user or other person accordingly.

In yet another example, all or portions of first information 402 may comprise image information captured via at least one user input device 310 (e.g., a camera, an optical scanner, etc.) and/or otherwise available in memory 304 (e.g., a downloaded data file, etc.) that may be processed by translation information service 114. Thus, in one example, a user may capture an image (e.g., signage photographed with a camera or a printed document scanned with an optical scanner) having a written phrase in a first language that may then be translated into a second written/spoken language by translation information service 114. Here, for example, a response 122 may comprise corresponding image, text, and/or audio information in the second language, which may then be presented through an output device and hopefully understood by the user. As with the previous examples, conversely, image information that the user understands may be translated and presented in a second language that another person will hopefully understand.

With these various examples in mind, translation information service module 318 (FIG. 3) in mobile station 102 may generate first information 402 using one or more input devices 310 and/or processing unit(s) 302.

In certain example implementations, translation information service module 318 in mobile station 102 may also generate and/or otherwise obtain metadata 404, e.g., using processing unit(s) 302. By way of example but not limitation, metadata 404 may comprise requested translation service information, location information, context information, time information, user information, mobile station information, and/or the like or any combination thereof.

For example, requested translation service information may identify the first and/or second languages or even additional languages, dialects, etc. In another example, requested translation service information may identify whether predicted responses and/or other additional information may or may not be desired in response 122. In another example, requested translation service information may identify one or more other options/selections associated with translation information service 114, such as, preferences relating to text, audio and/or image information in a response.

Metadata 404 may, for example, comprise location information associated with request for translation information 120 and/or an estimated location of mobile station 102. Thus, for example, as illustrate in FIG. 3, in certain implementations mobile station 102 may comprise a location identification module 314 and/or other like position estimation device and/or circuitry (not shown). Here, for example, location identification module 314 may be executed by processing unit(s) 302 to identify location 104. Location 104 may, for example, be identified by an identifier or name, a location context identifier (LCI), an address, applicable coordinate values, etc. In certain example implementations, mobile station 102 may comprise an orientation identification module 316 and/or other like orientation estimation device and/or circuitry (not shown). Here, for example, orientation identification module 316 may be executed by processing unit(s) 302 to estimate the spatial orientation of mobile station 102, which may be useful by translation information service 114 to identify location 104. Thus, orientation information may be included in the location information in metadata 404, for example, to help to identify a specific point of interest in a photograph captured by a camera of a mobile station.

Similarly, metadata 404 may comprise context information that may help to identify location 104 and/or otherwise be considered during translation. For example, context information may identify that location 104 is associated with a particular point of interest (e.g., a store in a shopping mall) and/or that translation information may relate to specific types of objects (e.g., electronics, pharmacy goods, clothing, etc.), services (health care, automobile repair, etc.), and/or relate in some manner to an identifiable event (e.g., holiday, sale, promotion, concert, etc.). Context information may, for example, be pre-stored in memory 304, and/or received from other resources 118 via network interface 308. Such example context information may therefore be statically and/or dynamically generated, either locally and/or remotely to mobile station 102.

Metadata 404 may comprise time information that may help to identify location 104 and/or otherwise be considered during translation. For example, time information may identify that location 104 is associated with a particular point of interest (e.g., an event) and/or that translation information may relate to a specific day or time of day. For example, certain languages use different terms or phrases depending on the time of day.

Metadata 404 may comprise user information that may help to identify location 104 and/or otherwise be considered during translation. For example, user information may identify certain demographical information about the user, user preferences, user associations, etc., that may be considered in identifying location 104 and/or otherwise made of use during translation. For example, certain languages use different terms or phrases depending on a user's gender and/or age. For example, certain businesses, cultures, etc., may provide specific services, events, resources, etc., for selected groups or associations of users, and hence user information may help to identify location 104 and/or an applicable translation under such circumstances.

Metadata 404 may comprise mobile station information that may be considered during translation and/or otherwise made of use in generating response 222. For example, mobile station information may identify certain characteristics of a mobile station, such as, an operating system, available protocols, applications, display device capabilities, audio reproduction capabilities, etc., that may be considered during translation and/or in generating response 222.

Figure 5:
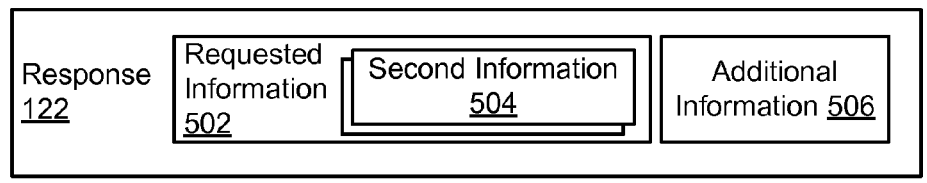
FIG. 5 is an illustrative depiction of a response to a request for translation information as may be transmitted to a mobile station, for example as in FIG. 1, in accordance with an implementation.

As illustrated by representative information 500 in FIG. 5, in certain example implementations, response 122 may comprise requested translation information 502 and optional additional information 506. Example information 500 may take the form of data that is represented by one or more signals and which may be stored in memory 204 and/or memory 304. All or portions of example information 500 may comprise text information, audio information, and/or image information in one or more formats that may be processed by translation information service module 318, for example.

In certain example implementations, requested translation information 502 may comprise second information 504 representing one or more versions of first information 402 as identified and translated by translation information service 114. For example, translation information service 114 may provide a translation from a first written/spoken language to a second written/spoken language. For example, translation information service 114 may provide a translation from a first dialect to a second dialect of a particular written/spoken language. In certain instances, different translated versions may be provided for further consideration by translation information service module 318 in mobile station 102. For example, translation information service module 318 may present such different translated versions to a user via one or more output devices 312, one or more of which may then be selected via one or more input devices 310. For example, different translated versions may relate to different dialects (and/or languages) and translation information service module 318 may present one or more versions to a user or other person. In other example implementations, translation information service module 318 may be capable of considering such different translated versions and selecting one or more for presentation. For example, different translated versions may relate to gender differences and translation information service module 318 may be programmed (e.g., via locally maintained user information) to select a particular version. In another example, different translated versions may relate to time of day differences and translation information service module 318 may be programmed to select a particular version based on local time.

Additional information 506, which may be optional, may comprise predicted response information and/or other information that may be of interest to a user (e.g., with regard to location 104 and/or possibly other locations nearby). Thus, for example, translation information service module 318 may present such additional information to a user via one or more output devices 312, which may enhance the user's experience and/or reduce the need for a mobile station to generate and transmit one or more subsequent requests for translation information.

Figure 6:
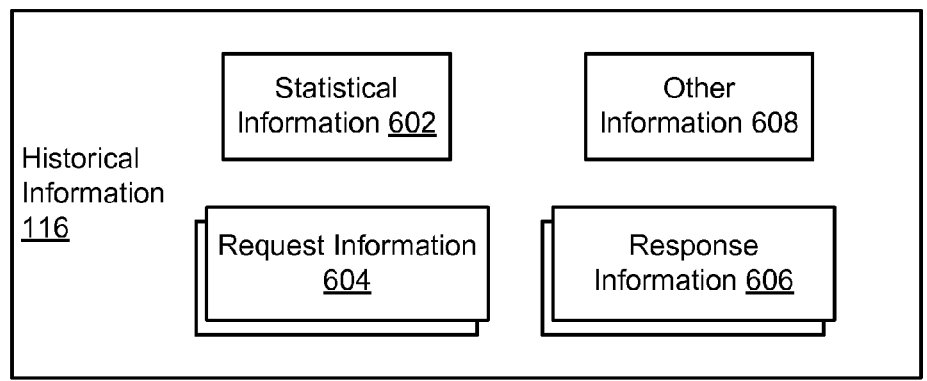
FIG. 6 is an illustrative depiction of historical information that may be accessed in generating a response to a request for translation information, for example as in FIG. 5, in accordance with an implementation.

As illustrated by representative information 600 in FIG. 6, in certain example implementations, historical information 116 may comprise statistical information 602 (e.g., associated with one or more locations), information 604 associated with a plurality of other requests for translation information, information 606 associated with a plurality of other responses for translation information, and/or other information 608 associated with one or more locations. Thus, for example, statistical analysis capabilities and/or other like known tools may be employed to establish statistical information 602 based, for example, on information 604, information 606, and/or information 608. Thus, in certain examples, statistical information 602 may identify whether, for a given location, certain terminology and/or other language characteristics (written or spoken) may be considered in providing a translation information service. For example, statistical information 602 may identify from previous requests/responses of a plurality of mobile stations that certain terms or phrases, dialects, etc., may have a higher probability at such location. Thus, a current response 122 from a translation information service 114 may comprise requested translation information 502 which is generated based, at least in part, on historical information 116 associated with the identified location. Accordingly, for example, such a response 122 may prove to be more relevant and/or accurate than it might otherwise have been.

Furthermore, in certain example implementations, metadata 404 may also be considered during translation and/or to identify a location. Thus, for example, statistical information 602 may further be based on metadata represented in information 604 associated with previously handled requests (e.g., associated with a given location). For example, statistical information 602 may identify that, given certain metadata, there is some measure of probability regarding the use or avoidance of certain terms, phrases, etc., when translating from one written/spoken language or dialect to another. Such statistical information may be associated with one or more given locations.

In still other example implementations, additional information associated with previously generated responses may also be considered during translation and/or to identify additional information 506 in a response 122. Thus, for example, statistical information 602 may further be based on additional data represented in information 606 associated with previously transmitted responses (e.g., associated with a given location).

Figure 7:
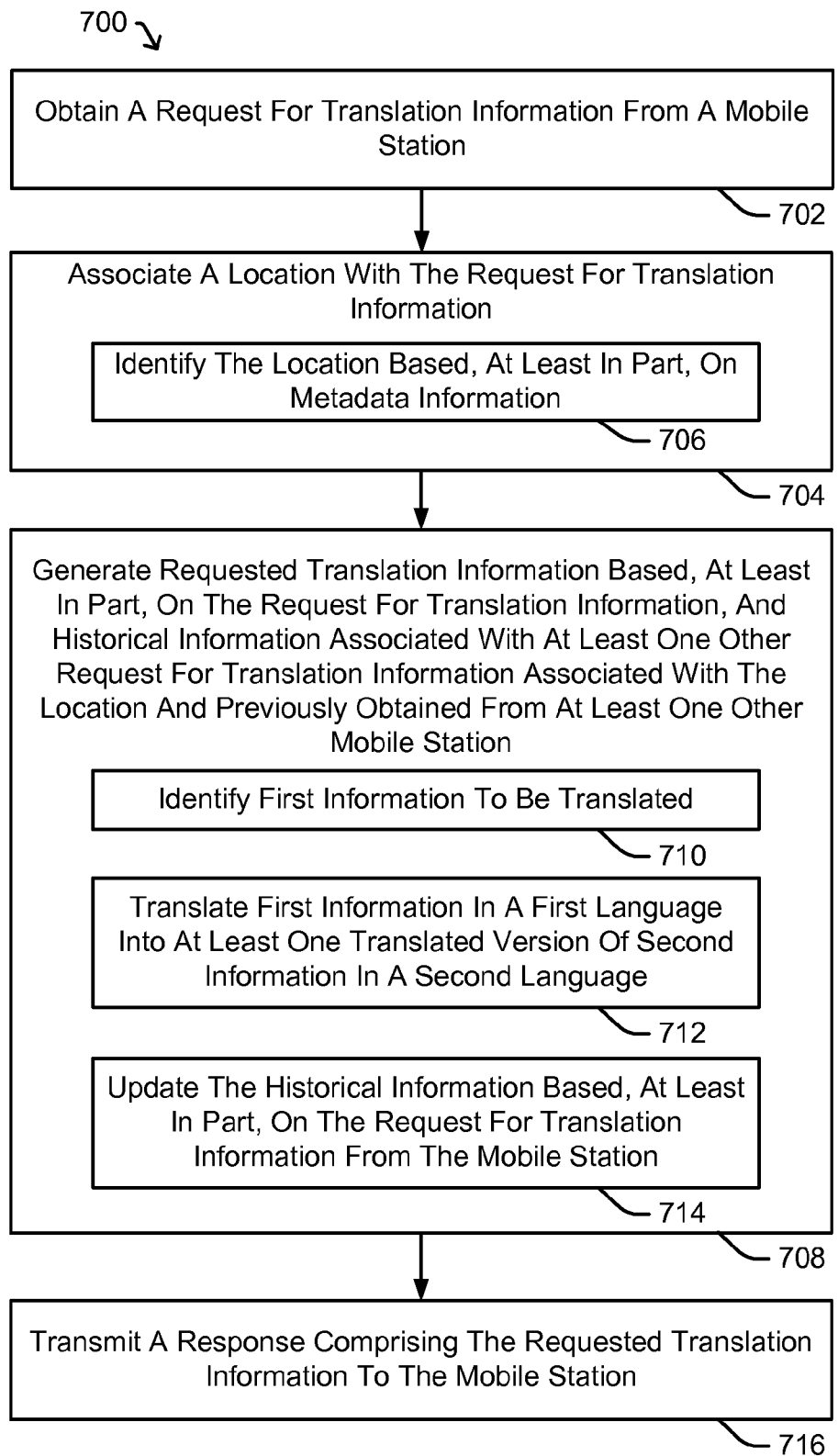
FIG. 7 is a flow diagram illustrating certain features of an exemplary process for use in one or more computing devices, for example as in FIG. 1, capable of providing translation information services to mobile stations, in accordance with an implementation.

FIG. 7 is a flow diagram illustrating certain features of an exemplary process 700 that may, for example, be implemented in one or more computing devices 112 (FIG. 1), in accordance with an implementation.

At block 702, a request for written/spoken language translation information may be obtained from a mobile station. For example, one or more transmitted messages may convey such request for translation information. It should be recognized that the techniques provided herein are not necessarily dependent on any specific communication technique (e.g., network, protocol, etc.), and that various communication techniques may be employed to provide the requisite communication of information associated a request for translation information and/or a response thereto. Indeed, in certain example implementations, a request for translation information and/or a response thereto may be communicated over various/different communication links using a variety of different communication techniques. For example, wireless and/or non-wireless communication links may be employed via one or more networks having the same or different protocols, etc. It should also, therefore, be recognized that in certain instances information may be represented as data which may be compressed, encoded, encrypted, etc., as part of a communication technique. Such communication and/or other like processing techniques are well known and continue to evolve.

At block 704 a location may be associated with the request for translation information. Here, for example, at block 706, the location may be identified based, at least in part, on metadata information.

At block 708, requested translation information may be generated based, at least in part, on the request for translation information, and historical information associated with at least one other request for translation information associated with the location and previously obtained from at least one other mobile station. Here, for example, at block 710 first information to be translated may be identified (e.g., from text, audio and/or image information). Here, for example, at block 712 the first information may be in a first language and translated into at least one translated version of second information, which may be in a second language. In certain example implementations, at block 714 the historical information may be updated or otherwise affected based, at least in part, on the request for translation information from the mobile station.

At block 716, a response comprising at least the requested translation information may be transmitted to the mobile station. For example, one or more transmitted messages may convey such response. In certain further example implementations, additional information may also be provided in a response.

Figure 8:
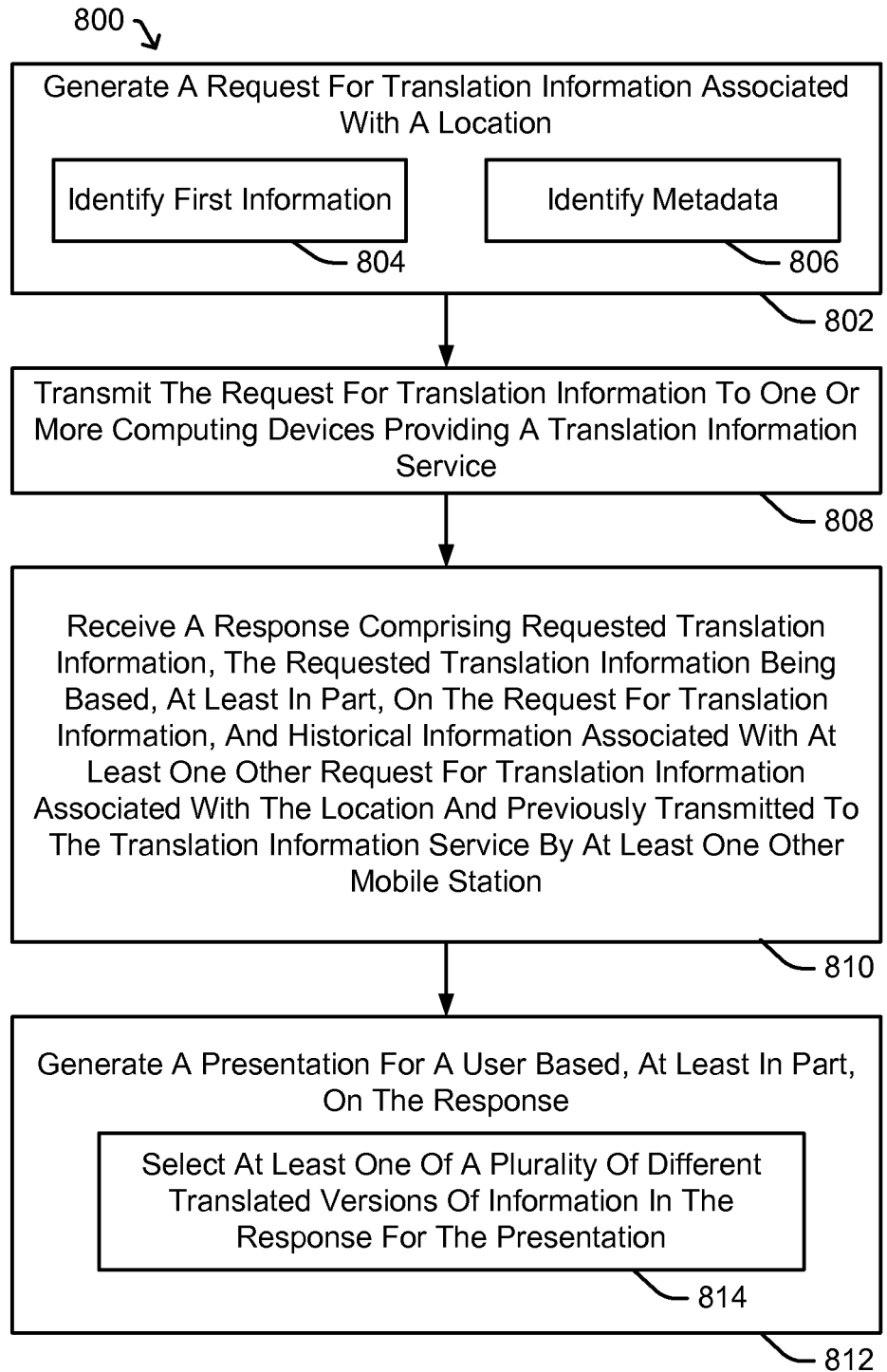
FIG. 8 is a flow diagram illustrating certain features of an exemplary process for use in a mobile station, for example as in FIG. 1, capable of requesting and receiving a translation information service, in accordance with an implementation.

FIG. 8 is a flow diagram illustrating certain features of an exemplary process 800 that may, for example, be implemented in mobile station 102 (FIG. 1), in accordance with an implementation.

At block 802, a request for translation information associated with a location may be generated. For example, at block 804, a request for translation information may comprise first information to be translated. For example, at block 806, a request for translation information may comprise metadata.

At block 808, a request for translation information may be transmitted to one or more computing devices providing a translation information service. For example, one or more transmitted messages may convey such request for translation information.

At block 810, a response may be received. Here, for example, such response may comprise requested translation information that is based, at least in part, on the request for translation information, and historical information associated with at least one other request for translation information associated with the location and previously transmitted to the translation information service by at least one other mobile station. In certain example implementations, a response may further comprise additional information.

At block 812, a presentation may be generated for a user based, at least in part, on the response. In certain example implementations, at block 814, at least one of a plurality of different translated versions of information in the response may be selected for the presentation.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearance of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. In still other memory devices, a change in physical state may involve quantum mechanical phenomena, such as, superposition, entanglement, or the like, which may involve quantum bits (qubits), for example. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A computer-readable (storage) medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state. The phrase "computer-readable medium" does not refer to a transitory propagating signal.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising: with at least one computing device:
   obtaining one or more signals representing a request for translation information from a mobile station, said translation information being associated with one or more written and/or spoken languages;
   associating a location with said request for translation information; and
   generating one or more signals representing requested translation information based, at least in part, on said request for translation information, said location, and predicted information, wherein the predicted information is associated with the request for translation information, the location, and at least one other request for translation information associated with at least one other location and previously obtained from at least one other mobile station.

2. The method as recited in claim 1, further comprising:
   transmitting one or more signals representing a response comprising said requested translation information to said mobile station.

3. The method as recited in claim 2, wherein said response comprises at least one of:
   text information, audio information, and/or image information.

4. The method as recited in claim 2, wherein said response further comprises additional information based, at least in part, on at least one of historical information, and/or metadata information identified in said request for translation information.

5. The method as recited in claim 1, wherein generating said one or more signals representing said requested translation information further comprises:
   translating first information of said request for translation information that is represented in a first language into corresponding second information represented in a second language, wherein said requested translation information comprises said second information.

6. The method as recited in claim 5, wherein said second information comprises a plurality of different translated versions of said first information.

7. The method as recited in claim 1, further comprising: with said at least one computing device:
   identifying first information to be translated based, at least in part, on said request for translation information.

8. The method as recited in claim 7, wherein said request for translation information comprises at least one of: text information, audio information, and/or image information.

9. The method as recited in claim 1, further comprising: with said at least one computing device:
   identifying metadata information associated with said mobile station based, at least in part, on said request for translation information.

10. The method as recited in claim 9, wherein said metadata information comprises at least one of: requested translation service information, location information, context information, time information, user information, and/or mobile station information.

11. The method as recited in claim 9, wherein associating said location with said request for translation information further comprises:
    identifying said location based, at least in part, on said metadata information.

12. The method as recited in claim 1, wherein said predicted information comprises statistical information based, at least in part, on a plurality of other requests for translation information associated with said location, the at least one other location, and previously obtained from a plurality of other mobile stations.

13. The method as recited in claim 1, wherein said location is associated with at least one of: a region, a structure, a point of interest, an estimated position of said mobile station, and/or an estimated orientation of said mobile station.

14. The method as recited in claim 1, further comprising:
    updating said historical information based, at least in part on said request for translation information from said mobile station.

15. An apparatus comprising:
- means for obtaining a request for translation information from a mobile station, said translation information being associated with one or more written and/or spoken languages;
- means for associating a location with said request for translation information; and
- means for generating requested translation information based, at least in part, on said request for translation information, said location, and predicted information, wherein the predicted information is associated with at least one other request for translation information associated with at least one other location and previously obtained from at least one other mobile station.

16. The apparatus as recited in claim 15, further comprising:
- means for transmitting a response comprising said requested translation information to said mobile station.

17. The apparatus as recited in claim 16, wherein said response further comprises additional information based, at least in part, on at least one of: historical information, and/or metadata information identified in said request for translation information.

18. The apparatus as recited in claim 15, further comprising:
- means for translating first information of said request for translation information that is represented in a first language into corresponding second information represented in a second language, wherein said requested translation information comprises said second information.

19. The apparatus as recited in claim 18, wherein said second information comprises a plurality of different translated versions of said first information.

20. The apparatus as recited in claim 15, further comprising:
- means for identifying first information to be translated based, at least in part, on said request for translation information.

21. The apparatus as recited in claim 15, further comprising:
- means for identifying metadata information associated with said mobile station based, at least in part, on said request for translation information.

22. The apparatus as recited in claim 15, wherein said predicted information comprises statistical information based, at least in part, on a plurality of other requests for translation information associated with said location, the at least one other location, and previously obtained from a plurality of other mobile stations.

23. The apparatus as recited in claim 15, further comprising:
- means for updating said predicted information based, at least in part on said request for translation information from said mobile station.

24. An apparatus comprising:
- a network interface;
- memory; and
- one or more processing units to:
  - access a request for translation information obtained from a mobile station via said network interface, said translation information being associated with one or more written and/or spoken languages;
  - associate a location with said request for translation information;
  - access predicted information stored in said memory, said predicted information being associated with at least one other request for translation information associated with said location, and at least one other request for translation information associated with at least one other location, and previously obtained from at least one other mobile station; and
  - generate requested translation information based, at least in part, on said request for translation information and said predicted information.

25. The apparatus as recited in claim 24, said one or more processing units to:
- initiate transmission of a response to said mobile station via said network interface, said response comprising said requested translation information.

26. The apparatus as recited in claim 25, wherein said response further comprises additional information based, at least in part, on at least one of: said predicted information, and/or metadata information identified in said request for translation information.

27. The apparatus as recited in claim 24, said one or more processing units to:
- translate first information of said request for translation information that is represented in a first language into corresponding second information represented in a second language, wherein said requested translation information comprises said second information.

28. The apparatus as recited in claim 27, wherein said second information comprises a plurality of different translated versions of said first information.

29. The apparatus as recited in claim 24, said one or more processing units to:
- identify first information to be translated based, at least in part, on said request for translation information.

30. The apparatus as recited in claim 24, said one or more processing units to:
- identify metadata information associated with said mobile station based, at least in part, on said request for translation information.

31. The apparatus as recited in claim 24, wherein said predicted information comprises statistical information based, at least in part, on a plurality of other requests for translation information associated with said location, the at least one other location, and previously obtained from a plurality of other mobile stations.

32. The apparatus as recited in claim 24, said one or more processing units to:
- initiate updating of said predicted information based, at least in part on said request for translation information from said mobile station.

33. An article comprising:
- a computer readable medium having stored therein computer-implementable instructions executable by one or more processing units to:
  - obtain a request for translation information from a mobile station, said translation information being associated with one or more written and/or spoken languages;
  - associate a location with said request for translation information; and
  - generate requested translation information based, at least in part, on said request for translation information, said location, and predicted information associated with the request for translation information, the location and at least one other request for translation information associated with at least one other location and obtained from at least one other mobile station.

34. The article as recited in claim 33, said computer-implementable instructions being further executable by said one or more processing units to:
   initiate transmission of a response comprising said requested translation information to said mobile station.

35. The article as recited in claim 34, wherein said response further comprises additional information based, at least in part, on at least one of: said predicted information, and/or metadata information identified in said request for translation information.

36. The article as recited in claim 33, said computer-implementable instructions being further executable by said one or more processing units to:
   translate first information of said request for translation information that is represented in a first language into corresponding second information represented in a second language, wherein said requested translation information comprises said second information.

37. The article as recited in claim 36, wherein said second information comprises a plurality of different translated versions of said first information.

38. The article as recited in claim 33, said computer-implementable instructions being further executable by said one or more processing units to:
   identify first information to be translated based, at least in part, on said request for translation information.

39. The article as recited in claim 33, said computer-implementable instructions being further executable by said one or more processing units to:
   identify metadata information associated with said mobile station based, at least in part, on said request for translation information.

40. The article as recited in claim 33, wherein said predicted information comprises statistical information based, at least in part, on a plurality of other requests for translation information associated with said location, the at least one other location, and previously obtained from a plurality of other mobile stations.

41. The article as recited in claim 33, said computer-implementable instructions being further executable by said one or more processing units to:
   initiate updating of said predicted information based, at least in part on said request for translation information from said mobile station.

42. A method comprising: with a mobile station:
   transmitting one or more signals representing a request for translation information from a translation information service, wherein said translation information is associated with a location and one or more written and/or spoken languages;
   receiving one or more signals representing a response comprising requested translation information, said requested translation information being based, at least in part, on said request for translation information, said location, and predicted information, wherein the predicted information is associated with the request for translation information, the location, and at least one other request for translation information associated with at least one other location and previously transmitted to said translation information service by at least one other mobile station; and
   generating a presentation for a user based, at least in part, on said response.

43. The method as recited in claim 42, wherein at least one of said request for translation information and/or said response comprises at least one of: text information, audio information, and/or image information.

44. The method as recited in claim 42, wherein said response further comprises additional information based, at least in part, on at least one of said predicted information, and/or metadata information identified in said request for translation information.

45. The method as recited in claim 42, wherein said request for translation information comprises first information that is represented in a first language, and said requested translation information comprises corresponding second information as translated in a second language.

46. The method as recited in claim 45, wherein said second information comprises a plurality of different translated versions of said first information, and further comprising: with said mobile station:
   selecting at least one of said plurality of different translated versions of said first information for said presentation.

47. The method as recited in claim 42, wherein said request for translation information further comprises metadata information.

48. The method as recited in claim 47, wherein said metadata information comprises at least one of: requested translation service information, location information, context information, time information, user information, and/or mobile station information.

49. The method as recited in claim 42, wherein said predicted information comprises statistical information based, at least in part, on a plurality of other requests for translation information associated with said location, the at least one other location, and previously transmitted to said translation information service by a plurality of other mobile stations.

50. The method as recited in claim 42, wherein said location is associated with at least one of: a region, a structure, a point of interest, an estimated position of said mobile station, and/or an estimated orientation of said mobile station.

51. An apparatus for use in a mobile station, the apparatus comprising:
   means for generating a request for translation information from a translation information service, wherein said translation information is associated with a location and one or more written and/or spoken languages;
   means for transmitting said request for translation information to said translation information service;
   means for receiving a response from said translation information service comprising requested translation information, said requested translation information being based, at least in part, on said request for translation information, said location, and predicted information, wherein the predicted information is associated with the request for translation information, the location, and at least one other request for translation information associated with at least one other location and previously transmitted to said translation information service by at least one other mobile station; and
   means for generating a presentation for a user based, at least in part, on said response.

52. The apparatus as recited in claim 51, wherein at least one of said request for translation information and/or said response comprises at least one of: text information, audio information, and/or image information.

53. The apparatus as recited in claim 51, wherein said response further comprises additional information based, at least in part, on at least one of said predicted information, and/or metadata information identified in said request for translation information.

54. The apparatus as recited in claim 51, wherein said request for translation information comprises first information that is represented in a first language, and said requested translation information comprises corresponding second information as translated in a second language.

55. The apparatus as recited in claim 54, wherein said second information comprises a plurality of different translated versions of said first information, and further comprising:
means for selecting at least one of said plurality of different translated versions of said first information for said presentation.

56. The apparatus as recited in claim 51, wherein said request for translation information further comprises metadata information.

57. The apparatus as recited in claim 56, wherein said metadata information comprises at least one of: requested translation service information, location information, context information, time information, user information, and/or mobile station information.

58. The apparatus as recited in claim 51, wherein said predicted information comprises statistical information based, at least in part, on a plurality of other requests for translation information associated with said location, the at least one other location, and previously transmitted to said translation information service by a plurality of other mobile stations.

59. The apparatus as recited in claim 51, wherein said location is associated with at least one of: a region, a structure, a point of interest, an estimated position of said mobile station, and/or an estimated orientation of said mobile station.

60. A mobile station comprising:
a network interface;
at least one user presentation device; and
one or more processing units to:
generate a request for translation information from a translation information service, wherein said translation information is associated with a location and one or more written and/or spoken languages;
initiate transmission of said request for translation information to said translation information service via said network interface;
access a response received from said translation information service via said network interface, said response comprising requested translation information, said requested translation information being based, at least in part, on said request for translation information, said location, and predicted information, wherein the predicted information is associated with the request for translation information, the location and at least one other request for translation information associated with at least one other location and previously transmitted to said translation information service by at least one other mobile station; and
initiate a presentation via said at least one user presentation device based, at least in part, on said response.

61. The mobile station as recited in claim 60, wherein at least one of said request for translation information and/or said response comprises at least one of: text information, audio information, and/or image information.

62. The mobile station as recited in claim 60, wherein said response further comprises additional information based, at least in part, on at least one of said predicted information, and/or metadata information identified in said request for translation information.

63. The mobile station as recited in claim 60, wherein said request for translation information comprises first information that is represented in a first language, and said requested translation information comprises corresponding second information as translated in a second language.

64. The mobile station as recited in claim 63, wherein said second information comprises a plurality of different translated versions of said first information, and said one or more processing units to:
select at least one of said plurality of different translated versions of said first information for said presentation.

65. The mobile station as recited in claim 60, wherein said request for translation information further comprises metadata information.

66. The mobile station as recited in claim 65, wherein said metadata information comprises at least one of: requested translation service information, location information, context information, time information, user information, and/or mobile station information.

67. The mobile station as recited in claim 60, wherein said predicted information comprises statistical information based, at least in part, on a plurality of other requests for translation information associated with said location, the at least one other location, and previously transmitted to said translation information service by a plurality of other mobile stations.

68. The mobile station as recited in claim 60, wherein said location is associated with at least one of: a region, a structure, a point of interest, an estimated position of said mobile station, and/or an estimated orientation of said mobile station.

69. An article comprising:
a computer readable medium having stored therein computer-implementable instructions executable by one or more processing units in a mobile station to:
generate a request for translation information from a translation information service, wherein said translation information is associated with a location and one or more written and/or spoken languages;
initiate transmission of said request for translation information to said translation information service;
access a response received from said translation information service, said response comprising requested translation information, said requested translation information being based, at least in part, on said request for translation information said location, and predicted information, wherein the predicted information is associated with the request for translation information, the location, and at least one other request for translation information associated with at least one other location and previously transmitted to said translation information service by at least one other mobile station; and
initiate a presentation for a user based, at least in part, on said response.

70. The article as recited in claim 69, wherein at least one of said request for translation information and/or said response comprises at least one of: text information, audio information, and/or image information.

71. The article as recited in claim 69, wherein said response further comprises additional information based, at least in part, on at least one of said predicted information, and/or metadata information identified in said request for translation information.

72. The article as recited in claim 69, wherein said request for translation information comprises first information that is represented in a first language, and said requested translation information comprises corresponding second information as translated in a second language.

73. The article as recited in claim 72, wherein said second information comprises a plurality of different translated versions of said first information, and said computer-implementable instructions being further executable by said one or more processing units to:

select at least one of said plurality of different translated versions of said first information for said presentation.

74. The article as recited in claim 69, wherein said request for translation information further comprises metadata information.

75. The article as recited in claim 74, wherein said metadata information comprises at least one of: requested translation service information, location information, context information, time information, user information, and/or mobile station information.

76. The article as recited in claim 69, wherein said predicted information comprises statistical information based, at least in part, on a plurality of other requests for translation information associated with said location, the at least one other location, and previously transmitted to said translation information service by a plurality of other mobile stations.

77. The article as recited in claim 69, wherein said location is associated with at least one of: a region, a structure, a point of interest, an estimated position of said mobile station, and/or an estimated orientation of said mobile station.

* * * * *